United States Patent [19]
Reynolds

[11] 3,716,069
[45] Feb. 13, 1973

[54] VALVES

[75] Inventor: Robin Francis Norman Reynolds, Sandton, Transvaal, South Africa

[73] Assignee: African Wire Ropes Limited, Johannesburg, Transvaal, South Africa

[22] Filed: Dec. 8, 1970

[21] Appl. No.: 96,205

[30]     Foreign Application Priority Data

Dec. 10, 1969   South Africa .......................698598

[52] U.S. Cl. ........137/244, 137/533.23, 137/533.25, 137/546, 251/214
[51] Int. Cl. ............................................F16k 15/06
[58] Field of Search......137/242, 244, DIG. 7, 514.5, 137/514.7, 529, 533.21, 533.23, 533.25, 542, 546; 251/54

[56]     References Cited
    UNITED STATES PATENTS

| | | | |
|---|---|---|---|
| 2,305,211 | 12/1942 | Walton | 137/DIG. 7 |
| 2,148,850 | 2/1939 | Deakins | 137/533.23 |
| 2,341,018 | 2/1944 | Clapp | 137/244 |
| 2,401,129 | 5/1946 | Arnold | 137/244 |

*Primary Examiner*—Henry T. Klinksiek
*Assistant Examiner*—Richard Gerard
*Attorney*—Sughrue, Rothwell, Mion, Zinn & Macpeak

[57]     ABSTRACT

A valve closure member formed as a piston in a sleeve with the valve being lifted out of the sleeve to enable slurry to pass, the piston being supplied with a special wiper provided to clean the sleeve on reciprocation therein with the valve also being guided back into the sleeve on closure. A peripheral track is provided around the sleeve to act as a trap for pebbles passing through the sleeve.

8 Claims, 1 Drawing Figure

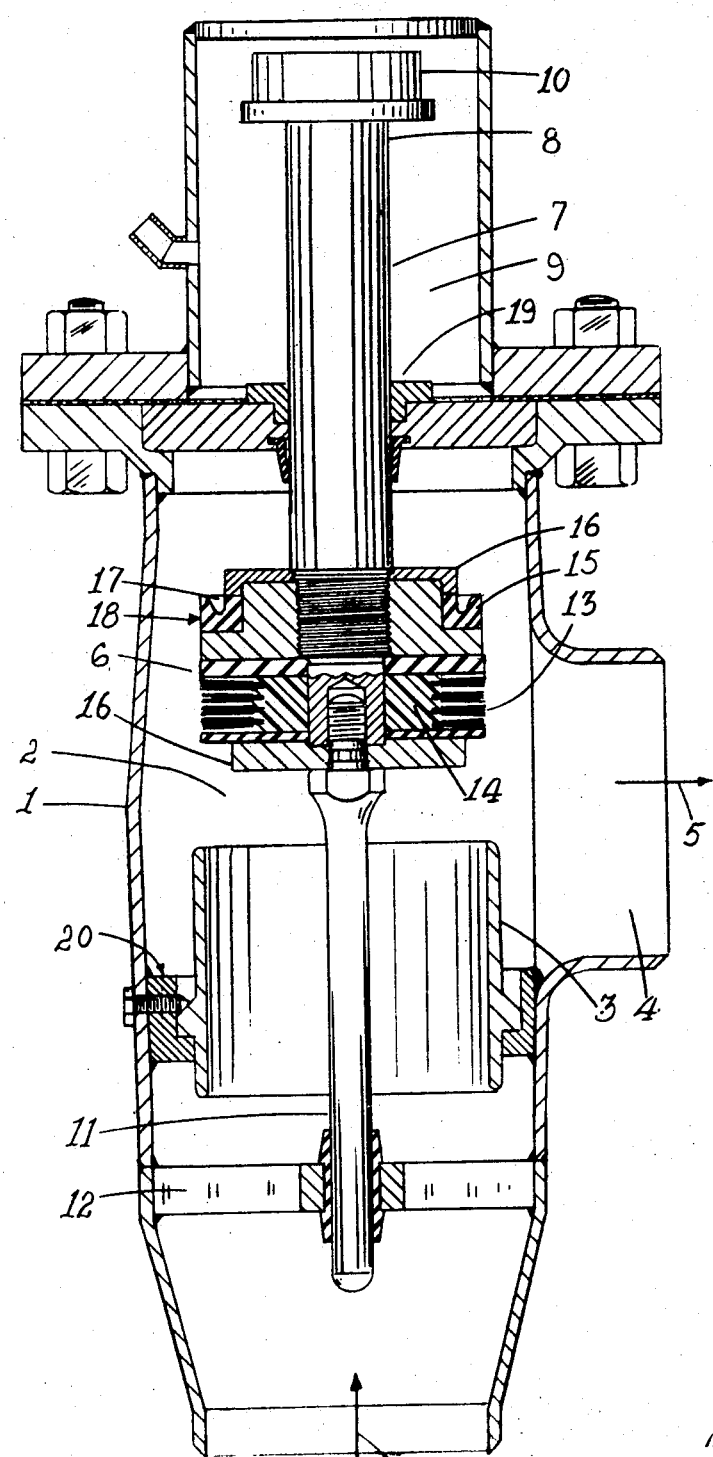
PATENTED FEB 13 1973
3,716,069
INVENTOR
ROBIN FRANCIS NORMAN REYNOLDS
BY Sughrue, Rothwell, Mion, Zinn & Macpeak
ATTORNEYS

VALVES

THIS invention relates to valves of the kind specially adapted for use in fluid lines where solid material in pellet, grit or like form may be in transit. Sludges and the like are included within this category.

An object of the present invention is the provision of a novel valve arrangement which the applicant believes will be capable of maintaining itself in substantially fully operative efficiency notwithstanding the presence of the solid material previously referred to. In this regard it is well known that a small stone or the like trapped between the seat and the valve closure member of a mushroom valve arrangement could render the valve wholly inoperative. It is believed that this situation will not normally arise with the arrangement of the invention.

According to the invention a valve includes a cylindrical sleeve constituting part of a pathway through the valve, a chamber into which the sleeve passes, a valve closure member in the form of a piston reciprocable in the sleeve and capable of being raised into the chamber clear of the sleeve to permit fluid sludge or the like to flow through the sleeve towards the chamber, and a wiper region around the piston which is biased into engagement with the walls of the sleeve bore and which acts to cleanse the bore as the closure member reciprocates therein.

The wiper may be a circumferentially disposed brush arrangement which sweeps over the bore walls, or alternatively, it may be one or more rubber or rubber-like discs.

Also according to the invention resilient sealing means is anchored around the periphery of the closure member which is biased into engagement with the bore walls of the sleeve. Preferably the sealing means is a resilient sealing ring which defines a circumferential channel with its mouth directed towards the chamber and its outer wall flared to engage the walls of the sleeve bore.

Further according to the invention the closure member is surmounted by a guide formation which acts to constrain the closure member for movement gravitationally in a path which returns it to the bore of the sleeve on closure of the valve and which limits the return travel of the closure member.

According further to the invention the formation is a pedestal arrangement which projects upwardly from the closure member and terminates in a mushroom head zone which is located in a compartment separated from the chamber. Preferably the compartment is maintained filled with a liquid preferably under pressure to ensure bleeding from the chamber into the compartment at a minimal level or to establish bleeding in the direction of the chamber.

The invention also provides for an arrangement wherein the sleeve projects into the chamber so that when the sleeve is substantially vertically located an annular duct is provided around the sleeve zone located in the chamber which serves as a trap preventing return of pebbles and the like down the sleeve.

In order to illustrate the invention an example is described hereunder with reference to the accompanying drawing which is a vertical section through one form of valve falling within the ambit of the attached claims.

Referring to the drawing the valve comprises a casing 1 defining a chamber 2 into which a sleeve-like inlet 3 passes, there being a suitable outlet 4 from the chamber so that pumped sludge or the like entering the chamber through the inlet sleeve 3 may ultimately proceed along the fluid line via the outlet 4, the general movement of the material through the pipeline being in the direction of arrows 5.

The valve closure member 6 is in the nature of a piston which is capable of reciprocating in the bore of the inlet sleeve 3 and of being raised completely clear of the sleeve as is shown in the accompanying drawing.

In the raised position material is free to flow through the pipe line but on pumping ceasing the piston closure member returns to the bore of the sleeve gravitationally to prevent return of sludge down the pipe line.

In the example under consideration the piston is characterized in a vertically directed pedestal 7 which is fast with the piston and projects upwardly so that its free end 8 is located in a compartment 9 with the free end terminating in a mushroom type head 10 so that the piston is restrained from falling through the sleeve. In addition a guide shaft 11 is located beneath the piston which slides in guide 12.

The piston itself is formed of a lower region defining a wiper brush 13 the bristles of which are mounted on a hub 14 and which project outwardly to form a sweeping engagement with the bore of the inlet sleeve 3. While the valve is closing the sleeve walls are therefore wiped clean of grit which may otherwise serve to impair the efficiency of the operation. An upper region of the piston also forms an anchorage for a sealing ring 15 of resiliently flexible material. This ring is trapped in position, as is the wiper brush, by suitable end plates 16 and it will be seen to define a circumferential channel 17 directed towards the chamber when the piston is in the sleeve. In the valve closed position the outer wall 18 of the sealing ring is necessarily forced into engagement with the walls of the sleeve by the pressure of fluid in the chamber. Sealing of the pipe line against reverse flow is therefore assured.

Compartment 9 is intended to be filled with a suitable liquid which in this example is under pressure to the extent that bleeding the the gland 19 in the direction of the compartment from the chamber 2 is minimal. Preferably, should any bleeding occur the flow should be in the opposite direction. The respective pressures in chamber 2 and compartment 9 are so nearly equal that any biasing effect from these pressures acting on the opposite ends of the effective cross-sectional areas of the pedestal 7 is negligible in view of the weight of the closure member 6, pedestal 7 and mushroom head 10, and thus gravity supplies the main closure force.

A further feature of the invention is that in making the sleeve upstanding in the chamber an annular duct 20 is provided between the sleeve and the inner walls of the chamber and this duct serves as a trap preventing pebbles and the like passing through the sleeve from returning to the downstream side of the valve.

As an alternative to the wiper brush 13 one or more rubber or rubber-like discs may be mounted on the piston so that their peripheral regions act to sweep down the walls of the sleeve bore.

I claim:

1. A valve comprising a valve housing including a cylindrical sleeve forming a bore in the valve housing; a chamber into which the sleeve passes; a valve closure member reciprocable in the sleeve and capable of being raised into the chamber clear of the sleeve to permit fluid, sludge or the like to flow through the sleeve towards the chamber; a circumferentially disposed wiper means mounted around the closure member which is biased into engagement with the walls of the sleeve bore and which sweeps over said walls to cleanse the bore as the closure member reciprocates in the sleeve, the wiper means being located within the sleeve in the closed position of the valve; and a guide means including a mushroom headed pedestal connected to the valve closure member which acts to constrain the closure member for movement gravitationally in a path which returns it to the bore of the sleeve on closure of the valve and which limits the return travel of the closure member, and a compartment operatively connected to the chamber and into which the pedestal passes with the mushroom head trapped in the compartment, the compartment being adapted to be filled with liquid under pressure to ensure that any bleeding from the chamber into the compartment will be at a minimal level.

2. The valve claimed in claim 1 in which the wiper means is a brush member.

3. The valve claimed in claim 1 further including a second guide means including a guide shaft mounted on the opposite end of the valve closure member from the first guide means.

4. The valve claimed in claim 1 including a resilient sealing means anchored around the periphery of the closure member which is biased into engagement with the bore walls of the sleeve.

5. The valve claimed in claim 4 in which the sealing means is a resilient sealing ring which defines a circumferential channel with its mouth directed towards the chamber and its outer wall flared to engages the walls of the sleeve bore.

6. The valve claimed in claim 4 where a pair of end plates hold the sealing means and wiper means in place between the end plates.

7. The valve claimed in claim 1 in which the sleeve projects into the chamber so that when the sleeve is substantially vertically located an annular duct is provided around the sleeve zone located in the chamber which serves as a trap preventing return of pebbles, grit or the like down the sleeve.

8. The valve claimed in claim 7 in which the outlet from the valve is disposed substantially at right angles to the inlet to the sleeve.

* * * * *